United States Patent
Bergström et al.

(10) Patent No.: US 11,284,469 B2
(45) Date of Patent: Mar. 22, 2022

(54) METHOD AND APPARATUS FOR HANDLING DISCONTINUOUS RECEPTION IN A COMMUNICATIONS NETWORK

(71) Applicant: Telefonaktiebolaget LM Ericsson (publ), Stockholm (SE)

(72) Inventors: Mattias Bergström, Sollentuna (SE); Gunnar Mildh, Sollentuna (SE); Riikka Susitaival, Helsinki (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 501 days.

(21) Appl. No.: 16/323,313

(22) PCT Filed: Aug. 18, 2017

(86) PCT No.: PCT/SE2017/050831
§ 371 (c)(1),
(2) Date: Feb. 5, 2019

(87) PCT Pub. No.: WO2018/034611
PCT Pub. Date: Feb. 22, 2018

(65) Prior Publication Data
US 2021/0289582 A1   Sep. 16, 2021

Related U.S. Application Data

(60) Provisional application No. 62/376,985, filed on Aug. 19, 2016.

(51) Int. Cl.
*H04W 76/28* (2018.01)
*H04L 1/18* (2006.01)
*H04W 52/02* (2009.01)

(52) U.S. Cl.
CPC ........... *H04W 76/28* (2018.02); *H04L 1/1812* (2013.01); *H04W 52/0225* (2013.01)

(58) Field of Classification Search
CPC .. H04W 76/28; H04W 52/0225; H04L 1/1812
See application file for complete search history.

(56) References Cited

U.S. PATENT DOCUMENTS

2007/0291729 A1   12/2007  Dalsgaard et al.
2011/0205928 A1*   8/2011  Pelletier ............... H04W 24/00
                                                           370/252
(Continued)

FOREIGN PATENT DOCUMENTS

CN    101355573 A     1/2009
WO    2010 044721 A1  4/2010
WO    2014 198479 A1  12/2014

OTHER PUBLICATIONS

Chinese Office Action issued for Application No. 201780050450. 3—dated Jun. 25, 2021.
(Continued)

*Primary Examiner* — Walli Z Butt
(74) *Attorney, Agent, or Firm* — Baker Botts, LLP

(57) ABSTRACT

Embodiments herein relate to a method, performed by a User Equipment (UE) 120, for handling discontinuous reception (DRX) operation. The method comprises applying a delay for at least one action performed as a response to data and/or signaling received by the UE during a predefined first time period after the UE 120 has entered an active state. Embodiments herein further relate to a method, performed by a network node 110, for handling discontinuous reception (DRX) operation. The method comprises sending a configuration message to a User Equipment (UE) 120, which message comprises information regarding actions to be delayed by the UE 120.

30 Claims, 9 Drawing Sheets

(56) References Cited

U.S. PATENT DOCUMENTS

| | | | |
|---|---|---|---|
| 2012/0155309 A1 | 6/2012 | Bae | |
| 2014/0269480 A1* | 9/2014 | Han | H04W 76/28 |
| | | | 370/311 |
| 2016/0143086 A1* | 5/2016 | Kahtava | H04W 76/28 |
| | | | 370/311 |
| 2018/0049271 A1* | 2/2018 | Bagheri | H04L 27/2601 |

OTHER PUBLICATIONS

Examination Report issued by Intellectual Property India for Application No. 201937002125—dated Oct. 28, 2020.
PCT Written Opinion of the International Searching Authority for International application No. PCT/SE2017/050831—dated Nov. 2, 2017.
3GPP TSG-RAN2#95; Gothenburg, Sweden; Source: Qualcomm Incorporated, Convida Wireless; Title: Connected Mode DRX Considerations (R2-165572)—Aug. 22-26, 2016.
International Search Report issued for International Application No. PCT/SE2017/050831—dated Nov. 2, 2017.

* cited by examiner

METHOD AND APPARATUS FOR HANDLING DISCONTINUOUS RECEPTION IN A COMMUNICATIONS NETWORK

PRIORITY

This nonprovisional application is a U.S. National Stage Filing under 35 U.S.C. § 371 of International Patent Application Serial No. PCT/SE2017/050831 filed Aug. 18, 2017 and entitled "METHOD AND APPARATUS FOR HANDLING DISCONTINUOUS RECEPTION IN A COMMUNICATIONS NETWORK" which claims priority to U.S. Provisional Patent Application No. 62/376,985 filed Aug. 19, 2016 both of which are hereby incorporated by reference in their entirety.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network.

Long Term Evolution (LTE) includes a discontinuous reception (DRX) mode to conserve the battery of a terminal device. When DRX mode is configured in a terminal device, the terminal device is able to turn its receiver off and enter a low-power state, waking for defined (periodic) phases to listen for scheduling messages or other wireless communications. For example, when the terminal device is in a DRX sleep state, it does not need to listen on the physical downlink control channel (PDCCH). When the terminal device is in the DRX active state, it must normally listen on the PDCCH to wait for potential scheduling messages from the network (e.g. from the eNodeB).

According to the 3rd Generation Partnership Project (3GPP) media access control (MAC) standard for LTE (Technical Specification Group 36.321, version 12.9.0), the terminal device is in the DRX active state when any of the conditions specified in section 5.7 is true, that is to say:

1 DRX parameters are not configured; or
2 DRX parameters are configured and
2.1 drx-InactivityTimer is running; or
2.2 drx-RetransmissionTimer is running; or
2.3 mac-ContentionResolutionTimer is running; or
2.4 a Scheduling Request sent on the physical uplink control channel (PUCCH) is pending; or
2.5 an uplink grant for a pending hybrid automatic repeat request (HARQ) retransmission can occur and there is data in the corresponding HARQ buffer; or
2.6 a PDCCH indicating a new transmission addressed to the C-RNTI of the terminal device has not been received after successful reception of a Random Access Response for the explicitly signaled preamble (only applicable to terminal devices in RRC_CONNECTED).

If none of these conditions is true, then the terminal device is in the DRX sleep state, (i.e. when its receiver is turned off).

A terminal device in RRC_CONNECTED state and which has been configured with the DRX function can be configured with both a long DRX cycle and a short DRX cycle. The intention with the long DRX cycle is that the terminal device should be able to sleep for a long time and wake up only periodically to listen for any new scheduling requests. The intention with the short DRX cycle is that the terminal device should be awake more frequently than in the long DRX cycle to listen for any scheduling requests. Those time periods when the terminal device is awake to listen for scheduling messages may be referred to as OnDuration periods, and are configured for a certain time duration. The scheduling messages sent from the UE to a network node may e.g. be a downlink assignment.

When the terminal device is scheduled, an inactivity timer called drx-InactivityTimer is started and while this timer is running the terminal device is awake to listen for any scheduling requests. When the drx-InactivityTimer expires, the terminal device will go to short DRX sleep, if configured, otherwise the terminal device will go to long DRX sleep.

If the terminal device has not been scheduled for a configured number of short DRX cycles the terminal device will go to long DRX sleep.

However, using a large value for the drx-InactivityTimer (such as 200 ms) will in many cases cause the terminal device to be awake for much longer than necessary which will increase the power consumption in the network.

SUMMARY

It is an object of embodiments herein to enhance performance of a wireless communications network, in particular to reduce energy consumption of a UE in the wireless communications network.

Embodiments herein relate to a UE, a network node and methods therein.

According to a first aspect of embodiments herein, the object is achieved by a method, performed by a User Equipment (UE), for handling discontinous reception (DRX) operation. The UE applies a delay for at least one action performed as a response to data and/or signaling received by the UE during a predefined first time period after the UE has entered an active state.

According to a second aspect of embodiments herein, the object is achieved by a method, performed by a network node, for handling discontinous reception (DRX) operation. The network node sends a configuration message to a User Equipment (UE), which message configures the UE to apply a delay for at least one action performed as a response to data and/or signaling received by the UE (120) during a predefined first time period after the UE (120) has entered an active state.

According to a third aspect of embodiments herein, the object is achieved by a User Equipment (UE), for performing a method for handling discontinous reception (DRX) operation. The UE is configured to apply a delay for at least one action performed as a response to data and/or signaling received by the UE during a predefined first time period after the UE has entered an active state period.

In some embodiments herein, the object is achieved by a User Equipment (UE) for performing a method for handling discontinous reception (DRX) operation. The UE comprises a delay module configured to apply a delay for at least one action performed as a response to data and/or signaling received by the UE during a predefined time period after the UE has entered an active state.

In some embodiments herein, the object is achieved by a User Equipment (UE) for handling discontinuous reception (DRX) operation. The UE comprises a processor and a memory. The memory contains instructions executable by said processor whereby said UE is configured to apply a delay for at least one action performed as a response to data and/or signaling received by the UE during a predefined time period after the UE has entered an active state.

According to a fourth aspect of embodiments herein, the object is achieved by a network node for performing a method for handling discontinous reception (DRX) operation. The network node is configured to send a configuration message to a User Equipment (UE). The message message configures the UE to apply a delay for at least one action performed as a response to data and/or signaling received by the UE (120) during a predefined first time period after the UE (120) has entered an active state.

According to some embodiments herein the network node for performing a method for handling discontinuous reception (DRX) operation comprises a sending module. The sending module is configured to send a configuration message to a User Equipment (UE). The message comprises information regarding actions to be delayed by the UE.

According to some embodiments herein the object is achieved by a network node for handling discontinous reception (DRX) operation. The network node comprises a processor and a memory, said memory containing instructions executable by said processor whereby said network node is configured to send a configuration message to a User Equipment (UE). The message comprises information regarding actions to be delayed by the UE.

The embodiments herein provide a solution, which may herein also be referred to as making it possible to immediately receive data or signaling in the UE without using a page response procedure while having similar processing requirements and therefore battery consumption as in IDLE mode. The solution is based on allowing a UE which has been configured with long DRX period more time, compared to UEs with short DRX, to process the data/signaling send to the UE before the UE is required to act on the data/signaling. Acting on the data may e.g. include monitoring a scheduling channel, or sending ARQ or HARQ feedback, or uplink data transmission such as e.g. if the UE has received an UL grant.

BRIEF DESCRIPTION OF THE DRAWINGS

Examples of embodiments herein are described in more detail with reference to attached drawings in which.

DETAILED DESCRIPTION

As part of developing embodiments, a problem will first be identified and discussed. Please note that the terms "UE" and "user equipment" are used interchangeably in this document.

3GPP contribution R2-165572 (http://www.3gpp.org/ftp/tsg_ran/VG2_RL2/TSGR2_95/Docs/R2-165572.zip) submitted to the 3GPP RAN WG2 meeting points at a problem in the UE to support connected mode DRX as it is currently defined in 3GPP.

<Begin of Text Copied from R2-165572>

2. Discontinuous Reception (DRX)

Figure 1:
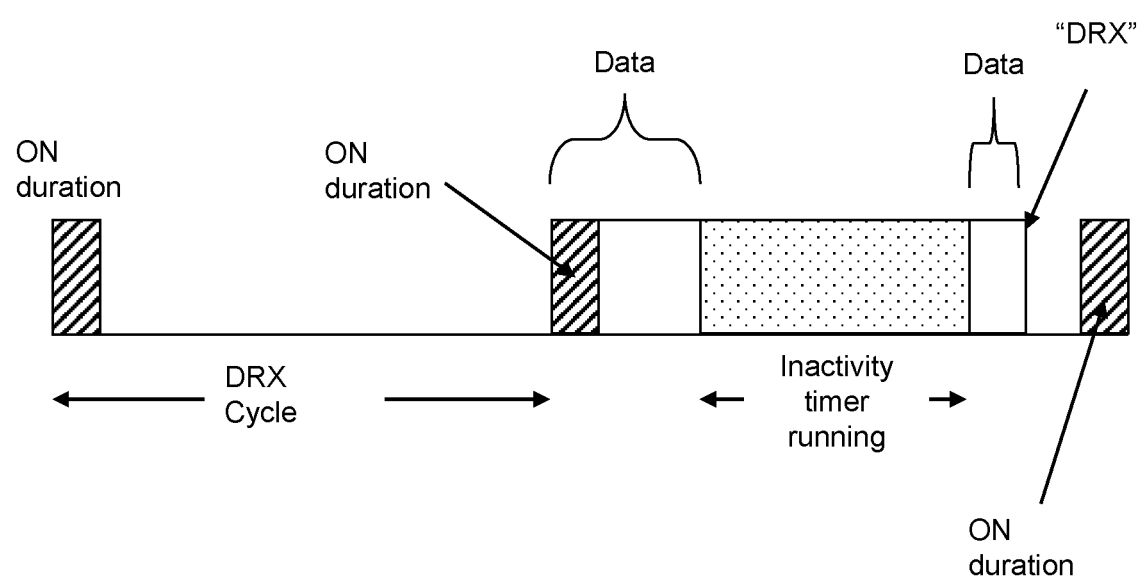
FIG. 1 is a schematic block diagram illustrating a DRX operation in E-UTRAN.

FIG. 1 shows a typical Connected Mode DRX (C-DRX) operation in E-UTRAN. The UE wakes up, which may also be referred to as entering an onDuration, once every DRX cycle to monitor the downlink during its ON duration. If the UE successfully decodes a Physical Downlink Control Channel (PDCCH) for a first transmission, the UE stays awake to receive on the downlink. Following any new data/signaling reception, the UE (re-) starts an inactivity timer. The UE re-enters DRX operation if the inactivity timer expires or if a MAC Control Element (CE) indicating "DRX" is received. In both cases, the DRX cycle that the UE follows after re-entering DRX is given by the following rules:

When a short DRX cycle is configured; the UE first follows the short DRX cycle and after a longer period of inactivity the UE follows the long DRX cycle;

Else the UE follows the long DRX cycle directly

However, Connected Mode DRX is not as power efficient as IDLE Mode DRX (I-DRX). Below a few related aspects are discussed:

1. The UE is expected to be able to receive data payload during and immediately following the ON duration. This consumes more power than page monitoring during paging occasion in IDLE mode where the UE is not expected to receive data immediately following the paging occasion.

2. Typical setting for LTE C-DRX ON duration is observed to be much larger compared to 1 ms paging occasion in IDLE mode. As a result the UE has to stay awake longer in C-DRX even if there is no data scheduled for the UE.

3. Typical setting for LTE C-DRX inactivity timer is observed to be of the order of 100 ms from field data. With client to application server RTT's typically less than 100 ms and multiple simultaneous connections supported by most applications, such a setting does not fully exploit the bursty nature of traffic as the device will very likely receive data before the 100 ms of inactivity timer expires. As a consequence, the device would stay awake for almost the entirety of its data transaction.

Thus, the following has been observed:

Observation 1: A C-DRX scheme which requires the UE to be able to receive data immediately following its C-DRX ON duration is not as power efficient for the UE as monitoring the paging occasion in I-DRX <end of text copied from R2-165572>

Regarding the validity of the problem described in R2-165572 it is herein disagreed with that it is commonly acknowledged that Connected mode DRX is not as power efficient as IDLE Mode DRX (I-DRX). It is however acknowledged that this may be so in some devices, depending on e.g. the implementation etc.

The problem, i.e. the increased power consumption in Connected-DRX, stems from the fact that a legacy UE is required to be able to receive data payload during and immediately following the ON duration, the UE is also expected to decode the data received during the OnDuration and provide HARQ feedback n milliseconds after reception, where n typically corresponds to 4 ms. This consumes more power compared to paging in IDLE state, since the UE immediately has to process the information it receives during the ON duration since there may be data scheduled for the UE. In Idle mode the UE has more time to process the paging channel since the Page response is not required to be sent immediately, it can e.g. be sent in the next or even in a later Random Access Channel (RACH) slot, which does not have to be in every TTI. In order to perform the delay sensitive processing in connected mode DRX, the UE needs to have more processing hardware (HW) activated which consumes more power. The advantage of the Connected mode DRX solution is a shorter delay compared to the IDLE mode procedure, since the UE may receive data immediately. In the IDLE mode procedure however, the UE needs to first send a page response message to the network which adds at least one RTT delay, plus the time it takes to wait for the next RACH slot.

Hence, embodiments herein describe improved methods for handling DRX operation, which may also be referred to as methods for DRX handling, which improves performance and energy consumption of the UE. It will sometimes say that the UE is in DRX state and is not monitoring certain channels. However, it should be appreciated that the DRX feature may only put requirements on when the UE shall be "awake", e.g. be in a non-power-saving-state, and not dictate when the UE shall not be "awake", e.g. be in a sleeping state or a power-saving-state. This means that the UE may be allowed to be in an "awake"/non-power-saving-state all the time, even if the DRX configuration does not require the UE to be in such a state.

It should further be appreciated that while the examples herein state that a UE is communicating with a network node, such as an eNB, it would also be possible to apply the embodiments herein to communication between any types of nodes. For example, in D2D-communication where two or more UEs are communicating with each other. In D2D communication the actions described herein as being performed by the network node, may also be performed by a second UE.

Figure 2:
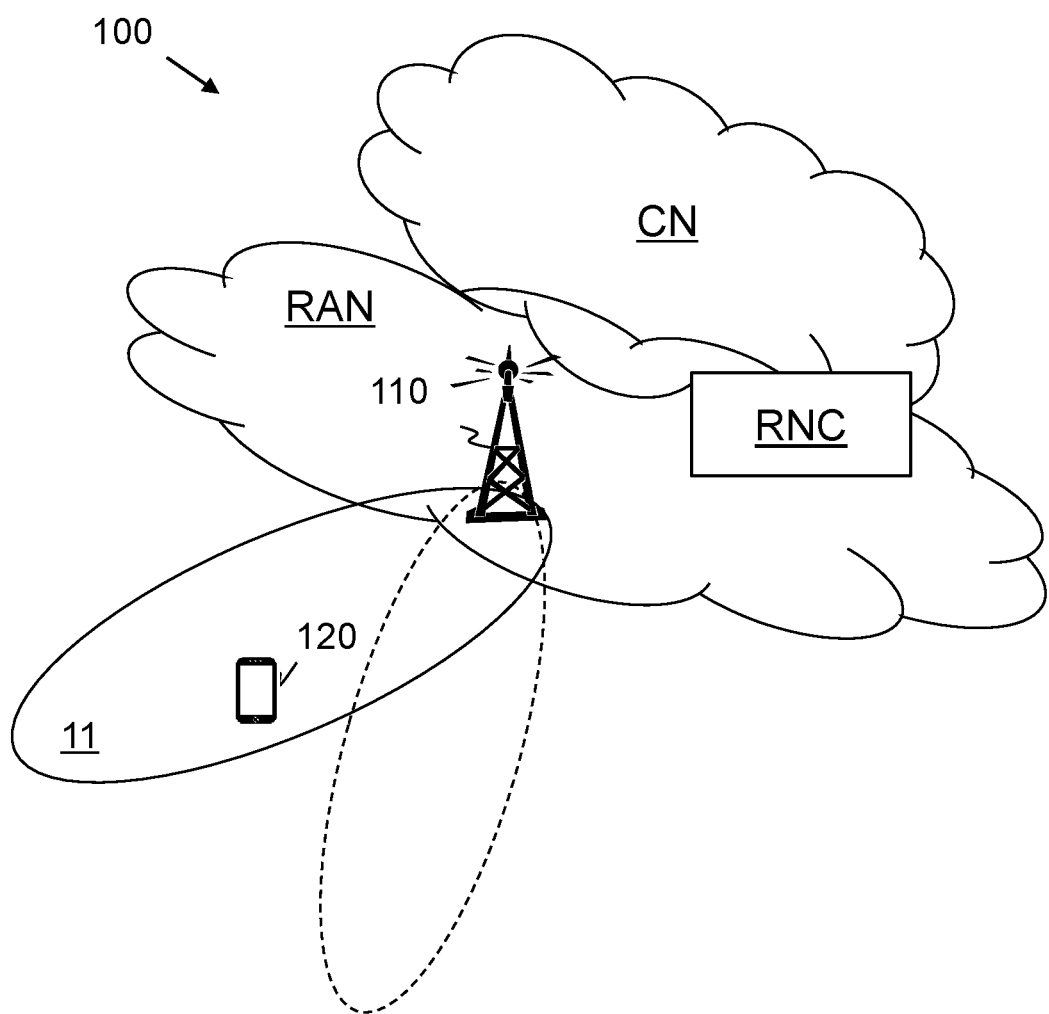
FIG. 2 is a schematic block diagram illustrating embodiments of a wireless communications network.

Embodiments herein relate to communication networks in general. FIG. 2 is a schematic overview depicting a communication network 100. The communication network 100 may be a wireless communications network comprising one or more RANs and one or more CNs. The communication network 100 may use a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices such as e.g. a UE 120. It should be understood by the person skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communication network 100 comprises a network node such as a radio network node 110 providing radio coverage over a geographical area, a service area 11, which may also be referred to as a beam or a beam group where the group of beams is covering the service area of a first radio access technology (RAT), such as 5G, LTE, Wi-Fi or similar. The radio network node 110 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit capable of communicating with a wireless device within the service area served by the radio network node 110 depending e.g. on the first radio access technology and terminology used. The radio network node 110 may be referred to as a serving radio network node and communicates with the wireless device 120 with Downlink (DL) transmissions to the wireless device 10 and Uplink (UL) transmissions from the wireless device 120.

Figure 3:
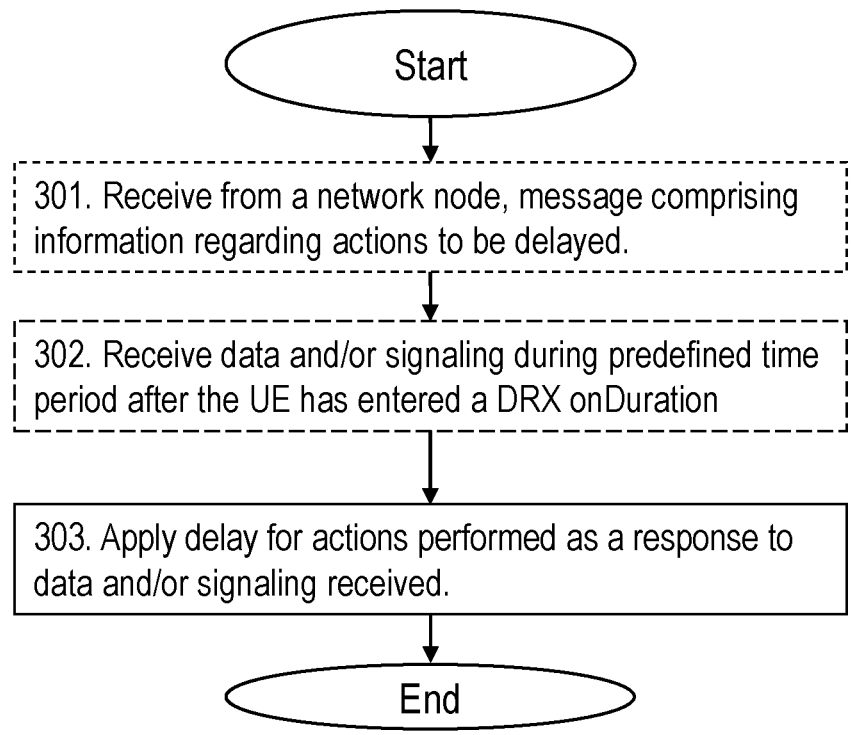
FIG. 3 is a flowchart depicting embodiments of a method performed in a UE.

FIG. 3 discloses a flowchart depicting embodiments of a method performed by the UE 120, for handling DRX operation. Handling DRX shall herein be interpreted as handling the operation of the DRX, such as e.g. handling the duration of the DRX cycles. Actions performed in some embodiments only are marked with dashed boxes.

Action 301: In some embodiments the UE 120 may receive a message comprising information regarding actions to be delayed from a network node 110. The message may comprise only an indication that actions may be delayed. The actions to apply the delay to may be specified in a specification. In some further embodiments the message may however also comprise information about e.g. which action or which actions to apply the delay to, the amount of time the action(s) should be delayed, which may also be referred to as delay duration, and/or conditions for when the delays should be applied. The conditions may e.g. be the type of DRX-cycle the UE applies, see also "Conditional applying of behaviors".

In some embodiments the action may be a decoding of a received signal, the information may e.g. comprise a decoding delay to be applied to signals received by the UE 120 during a predetermined first time period from the entering of an active state. The active state may be a semi-awake state in which the UE listens for a specific signal which may be received using only a part of a radio unit. The specific signal may e.g. be a signal which is easy to decode. The active state may in some embodiments e.g. be a DRX onDuration period.

The action may also be an exiting of a DRX state and the information may comprise an indication that the UE 120 shall exit an inactive state. In this case the information may further comprise a time period within which the UE 120 is required to exit an inactive state.

Action 302: The UE 120 may receive data and/or signaling when the UE has entered an active state.

Action 303: The UE 120 applies a delay for at least one action performed as a response to data and/or signaling received by the UE 120 during a predefined first time period $T_A$ after the UE 120 has entered an active state, which in Example embodiment C, that will be described in the following, is referred to as that the UE woke up recently. In the following the wording predefined and predetermined may be used interchangeably. The UE 120 may apply the delay according to information comprised in the message received from the network node 110.

In some embodiments the action may be a decoding of a received signal. The UE 120 may apply a first decoding delay D1 for signals received by the UE 120 during the predefined first time period from the entering of the active state. The predefined first time period $T_A$ may be one or more Transmission Time Intervals, TTI. The UE 120 may further apply a second decoding delay D2 for signals received by the UE 120 after the predefined first time period $T_A$ from entering the active state. The second coding delay D2 may be shorter than the first coding delay D1, hence the first decoding delay is an increased decoding delay. The UE 120 may further apply the delay by applying the first decoding delay D1 to data and/or signaling received during the active state. The UE 120 may reduce or remove the coding delay when the time from entering the active state has exceeded the predetermined first time period, i.e. when the UE 120 has been in the active state for a longer time than the predetermined first time period. The predetermined first time period may herein also be referred to as the first time limit. In the following, the UE 120 being in active state may also be referred to as the UE 120 being awake. This embodiment corresponds to the Example Embodiment A described below.

In some second embodiments the action may be a transmission of a HARQ feedback. The UE may apply the delay by delaying the transmission of HARQ feedback for DownLink (DL) and/or UpLink (UL) data during a predetermined second time period after the UE has entered the DRX onDuration. The predetermined second time period may be one or more Transmission Time Interval(s) (TTI).

In some embodiments herein the action may be a transmission of Hybrid Automatic Repeat Request (HARQ) feedback. The UE 120 may apply the delay by delaying the transmission of HARQ feedback for downlink (DL) and/or uplink (UL) data during a predefined second time period $T_B$, which may herein also be referred to as a time limit, after the UE 120 has entered the active state, i.e. when the UE has not been awake for more than the predetermined second time period $T_B$, see also Example embodiment B. The predefined second time period $T_B$ may be one or more TTIs. The UE 120 may in some embodiments also omit to send a HARQ feedback for DL and/or UL data during the predefined second time period $T_B$ after the UE 120 has entered the active state, such as e.g. the DRX onDuration. This embodiment corresponds to the Example Embodiment B described below.

In some embodiments the action may be a starting of a timer. The UE 120 may apply the delay by applying a delayed starting of the timer during a predefined third time period $T_C$ after the UE 120 has entered the active state, i.e. if the UE 120 has been in the active state for a shorter time than $T_C$. If the UE 120 has been awake for less than the third time period $T_C$, the starting of the timer may be delayed until the third time period $T_C$ has passed. Hence, the UE 120 may start the timer at a first point in time from an event when the UE 120 after the third time period $T_C$ has passed and start the timer at a second point in time from an event within the third time period $T_C$, see also Example embodiment C. The timer may e.g. be an inactivityTimer. The predetermined third time period $T_C$ may be one or more TTIs. The UE 120 may in some embodiments apply an adjusted duration of the timer when a delayed starting of the timer has been applied. Thereby the the expiry of the timer may be the same regardless if the UE 120 did a delayed start or a non-delayed start of the timer. This embodiment corresponds to the Example Embodiment C described below.

In some embodiments herein, the action may be an entering of a DRX state. When the UE 120 has received an indication from a network node 110 indicating that the UE 120 shall enter an active state, which may also be referred to as the UE 120 entering an awake state, when it has been inactive, which may also be referred to as have been sleeping, the UE 120 may apply the delay by applying a delay to the entering of the active state. This embodiment corresponds to the Example Embodiment D described below.

The predefined first, second and third time periods $T_A$, $T_B$, $T_C$ are shorter than the active state period for receiving data and/or signaling. The predetermined time periods $T_A$, $T_B$, $T_C$ may be one or more Transmission Time Interval(s) (TTI).

Example Embodiment A

According to some first embodiments herein the UE may conditionally decode a signal received from the network, such as e.g. from a network node, with a longer delay depending on a configuration received from the network and/or on how long the UE has been in an awake state. For example, the UE may apply a longer decoding delay D1 if the UE has been awake less than a time $T_A$, while applying a shorter decoding delay D2 if the UE has been awake for longer than time $T_A$.

Figure 4A:
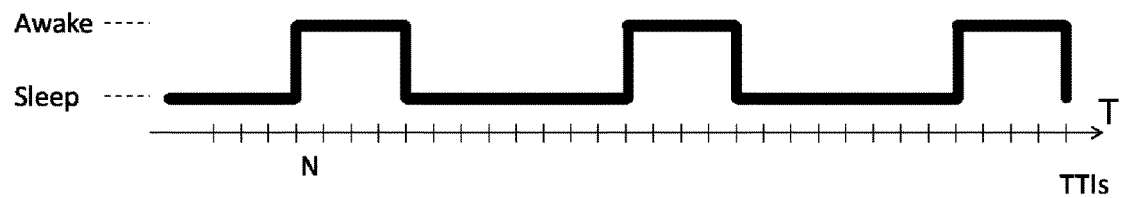
FIG. 4a is a schematic block diagram of a DRX operation according to a first embodiment herein.

An example of this is illustrated in FIG. 4a (T=2). If the UE 120 is, according to the DRX-configuration, required to be awake in TTI N, N+1, N+2 and N+3, the UE 120 would according to this embodiment be allowed to apply a longer decoding delay in TTI N and N+1 than it would be allowed to apply in TTI N+2 and N+3. This is because the UE 120 in TTI N and N+1 would not have been awake for 2 TTIs yet, but in TTI N+2 and N+3 the UE has been awake for T=2 TTIs and hence the UE 120 may apply a shorter decoding delay.

The UE 120 may of course be allowed to decode the message quickly, however the intention of the embodiments herein is to allow the UE 120 to decode slower which may save power. The UE 120 may only be allowed to apply this slow decoding for a certain period of time after it has entered active state, which may herein also be referred to as active time. For example, if the UE 120 wakes up from an inactive state, such as e.g. non-active time according to a DRX configuration, the UE 120 may be allowed to apply the slow decoding only for a short period of time, such as e.g. a few TTIs, after it has entered active time which may also be referred to the UE 120 being awake.

The UE 120 may be allowed to apply slow decoding only during an OnDuration, i.e. data needs to be received during subframes corresponding to an OnDuration timer. The OnDuration may herein also be referred to as a DRX OnDuration. Furthermore, the UE 120 may be instructed to apply slow decoding during the OnDuration timer associated with the long DRX cycle. The onDurationTimer specifies the number of consecutive PDCCH-subframe(s) at the beginning of each DRX Cycle (DRX ON), i.e. the number of subframes over which the UE shall read PDCCH during every DRX cycle before entering a power saving mode.

Example Embodiment B

According to some second embodiments herein, the UE 120 may omit or delay HARQ feedback when the UE 120 has not been awake for more than a time $T_B$. Alternatively, the UE 120 may omit or delay HARQ feedback if it has not been awake during the past time $T_B$. The UE 120 behavior for which conditions to omit or delay feedback could be hardcoded in the standard or configured by the network, e.g. by means of the network node 110, using signaling.

In one embodiment the UE 120 may omit or delay HARQ feedback for DL and UL data received during the OnDuration timer of the long DRX cycle.

This would for example allow the transmitter in the UE 120 to be turned off longer periods of time since the UE 120 may not need to start the UL transmitter in the UE 120 prior to determining that anything has been received which requires feedback. For example, in LTE today the UE 120 should respond with HARQ feedback 4 TTIs after the UE 120 has received something in downlink to ACK/NACK the reception. So if the UE 120 is in onDuration, i.e. when the onDuration timer is running, in TTI N, the UE 120 would need to ensure that the transmitter needs to be awake at time N+4 to be prepared to send feedback. This may require the UE 120 to start the uplink transmitted before N+4, and maybe even before the UE 120 has decoded downlink and knows whether the UE 120 needs to respond with HARQ feedback at all. This would therefore result in that the UE 120 would activate the uplink transmitter unnecessarily since the UE would activate the uplink transmitter even if the UE 120 does not detect any downlink transmission (and hence no feedback should be sent). Hence this embodiment could allow the UE 120 to activate the uplink transmitter only when the UE 120 has detected a transmission from the network and hence only when feedback needs to be transmitted and hence power could be saved in the UE 120.

Example Embodiment C

According to the DRX-feature in LTE the UE 120 is applying an "inactivityTimer" which is started in response to communication with the network. E.g. if the network schedules the UE 120 for an uplink transmission the UE 120 should start the inactivityTimer and stay awake while that timer is running.

According to some third embodiments herein the UE 120 may start one or more certain timer, such as e.g. the inactivity timer or a DRX retransmission timer, at a first point in time (relative to an event) if the UE 120 has been awake for more than a time $T_C$, while starting the timer(s) at a second point in time (relative to an event) if the UE 120 has been awake for less than a time $T_C$. This would allow the UE 120 to apply a delayed starting of a timer if the UE 120 woke up recently, i.e. less than a time $T_C$ ago.

Figure 4B:
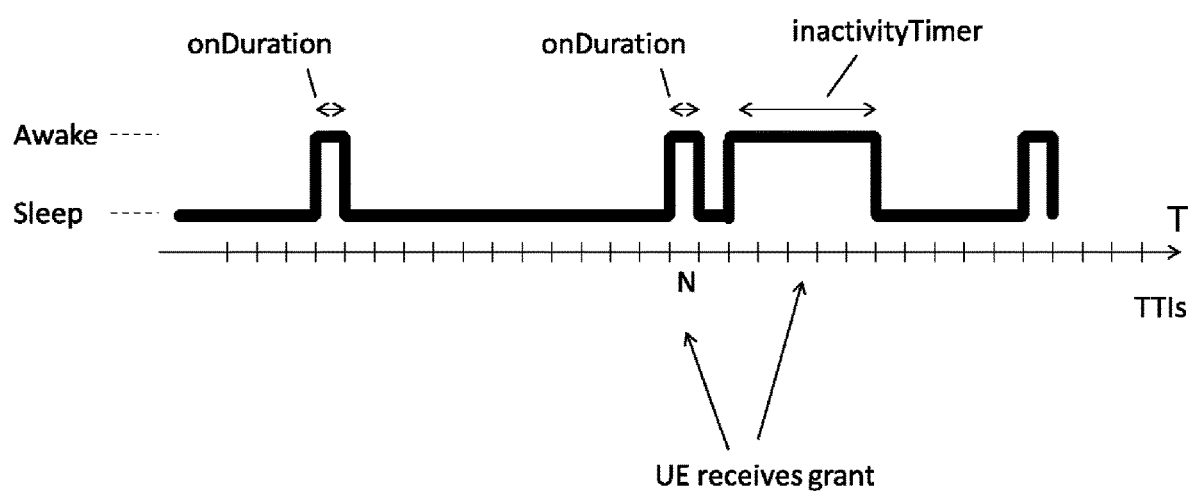
FIG. 4b is a schematic block diagram of a DRX operation according to a first embodiment herein.

An example of this is shown in FIG. 4b, where T=2 and the inactivity timer duration is 3 TTIs. If the UE 120 gets an UL grant in TTI N, the UE 120 will apply a delayed starting of inactivityTimer since the UE 120 has not been awake for 2 TTIs. In this example the timer will be started in TTI N+2. However for the second time the UE 120 receives a grant (in TTI N+4) the UE 120 has been awake for 2 TTIs and hence applies another starting-time for the inactivityTimer and in this example the UE 120 (re)starts the inactivity timer directly without any delay.

In some embodiments, when the UE 120 applies a delayed starting of the timer, such as e.g. the inactivity timer or a DRX retransmission timer, the UE 120 may adjust the timer duration. The benefit of this is that the expiry of the timer may be the same regardless if the UE 120 did a delayed start or a non-delayed start. For example, if the UE 120 has delayed the starting of a timer T1 seconds and the duration of the timer is T2, the UE 120 may adjust the duration of the timer to be T2−T1 which ensures that the timer would end at T2 regardless if the UE 120 did a delayed or non-delayed starting of the timer.

Figure 5:
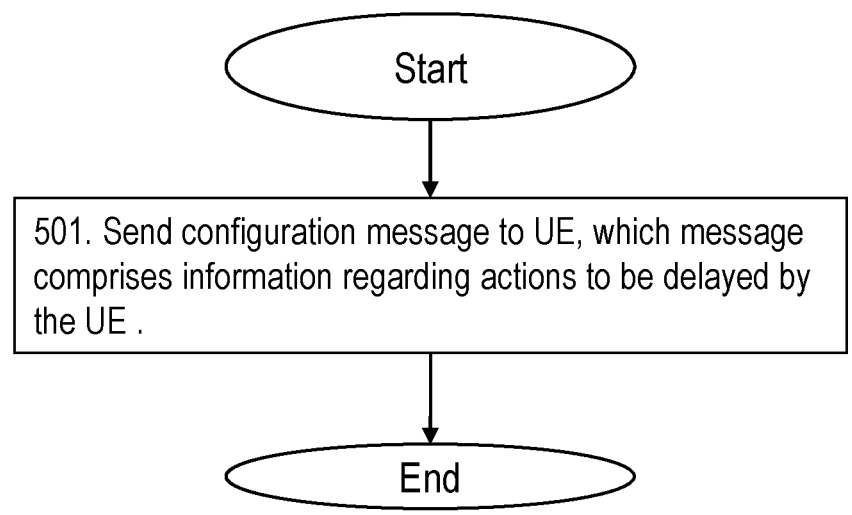
FIG. 5 is a flowchart depicting embodiments of a method performed in a network node.

In the example scenario as described in FIG. 5 and with the behavior as described, as described above, if the UE 120 receives a grant in TTI N+2 the UE 120 would not have been awake for more than 2 TTIs since the UE 120 may just have started the inactivityTimer and hence just entered the "awake"-state. Therefore, according to the embodiment described above, the UE 120 may apply a delayed start of the inactivityTimer. However, since the UE 120 received a grant in TTI N it may be so that the UE 120 could apply a non-delayed starting of the timer(s). Hence, in one embodiment the UE 120 may apply a delayed start of the timer if the UE 120 has not been active more than a certain time T3 ago. If T3 is set to e.g. 5 TTIs this would ensure that if the UE 120 has been awake recently (less than 5 TTIs ago) then the UE 120 may apply a non-delayed starting of the timer.

Embodiment D

According to some fourth embodiments herein, a network node 110, such as e.g. an eNB, may indicate to the UE 120 that the eNB wants the UE 120 to exit from a DRX state, such as e.g. enter an awake state from a sleeping state. This will for simplicity be referred to as a "wake up"-message. This "wake up"-message may be a message which does not require heavy processing and hence may be decoded by the UE 120 with a limited power consumption. If it e.g. is possible to decode the message very quickly, it may be possible to decode the message without too tight time requirements.

In response to receiving the wake up-message the UE 120 may be required to exit from a DRX state.

In one version of this embodiment the UE 120 may be required to exit the DRX state within a certain period of time $T_{WU}$ after receiving/decoding the "wake up"-message.

With a short value $T_{WU}$ the UE 120 would be required to quickly wake up which may not allow the UE 120 to save a lot of power since the UE 120 may not be able to turn off some components within the UE 120 since some components may not be possible to turn on/off quickly. However, with a short value $T_{WU}$ it would be a smaller delay for exiting the DRX state and hence lower latency for starting communication could be lower which may improve performance in terms of user experience, system capacity, etc.

On the other hand, with a long value $T_{WU}$ the UE 120 may be able to save more power since it may be able to turn off more components in the UE 120 and hence save more power. This may however result in longer delay for waking up and hence longer delay is induced for starting communication which may impair user experience, system capacity, etc.

The value $T_{WU}$ may be specified in a specification and may for example be a certain number of TTIs, or a certain number of milliseconds, etc. Another possibility is that the value $T_{WU}$ is configured by the network. The network could determine a suitable value Twi depending on the situation. If for example it is important to quickly start communication a short $T_{WU}$ could be configured, while if power savings in the UE 120 is more important a longer $T_{WU}$ could be configured.

In one embodiment herein, the wake up message may be indicated in a Downlink Control Indicator (DCI) of a physical control channel. In this case, the UE 120 may not be required to receive data channel if it has been sleeping recently. The physical data channel may be used to indicate pure wakeup signal or wakeup signal together with scheduling grant or assignment to be valid in near future.

In one embodiment, the UE 120 only required to monitor physical control signals indicating UL scheduling. This means that the UE 120 does not need to monitor and decode downlink data channels at all when it has been sleeping. This behavior can be applicable for the scenario when the UE 120 has been inactive over time period $T_D$. Alternatively the UE 120 may monitor control signaling related to only UL during an OnDuration of the long DRX cycle. The OnDuration timer and the cycle for the UL related reception may be separately configured by the network.

In the above it has been assumed that the UE 120 monitors the "wake up" message when it is in Active Time. In one embodiment herein the eNB may provide a configuration indicating when the UE 120 shall monitor the "wake up" message. This may be a periodically occurring time duration and may be configured by a periodicity, and monitoring-duration which indicates for how long (each period) that the UE 120 shall monitor for the message. In addition an offset may be provided to the configuration indicating when, in relation to a reference, such as e.g. System Frame Number (SFN) 0, the UE 120 monitoring-durations should occur/start.

It should be appreciated that even with the above described explicit configuration for when the UE 120 shall monitor for the "wake up" message, the UE 120 may also monitor for the "wake up" message in other times, such as e.g. according to the DRX configuration.

FIG. 5 discloses a flowchart depicting embodiments of a method performed by the network node 110, for handling DRX operation.

Action 501: The network node 110 may send a configuration message to the UE 120. The configuration message may comprise information regarding actions to be delayed by the UE 120. The message may comprise information about which action or which actions to apply the delay to, the amount of time the action(s) should be delayed and/or conditions for when the delays should be applied. In some embodiments the action may be a decoding of a received signal, the information may e.g. comprise a decoding delay to be applied to signals received by the UE 120 during a predetermined first time period from the entering of an active state. The active state may be a semi-awake state in which the UE listens for a specific signal which may be received using only a part of a radio unit. The specific signal may e.g. be a signal which is easy to decode.

Conditional Applying of Behaviors:

Whether the UE 120 applies the behaviors according to the embodiments A to D described herein, such as e.g. slow decoding, delayed timer start, etc., or not may be configured by the network, e.g. by means of the network node 110. This may e.g. be configured using RRC signaling. The network may determine whether to configure the behaviors described herein for the UE 120 based on which traffic the UE 120 has active, which types of bearers the UE 120 has active, the need for power savings for the UE 120, etc.

For example, if the network determines that the UE 120 has a voice-bearer configured/active, then there is a chance that voice-traffic may arrive to the UE 120. Hence it may be critical that the UE 120 wakes up quickly and quickly decodes traffic, since voice traffic may have tight delay-requirements. Hence, in this scenario the network may configure that the UE 120 should not apply slow decoding. This configuration may be performed by sending the configuration message as described in Action 501.

According to another embodiment, the UE 120 may apply different behaviors depending on which type of DRX-cycle the UE 120 is applying. For example, if the UE 120 is applying a long DRX-cycle, the UE 120 may apply behaviors which the UE 120 does not apply when applying a short DRX-cycle. This is beneficial since long DRX is in general a state where more power should be saved since this is the state when the UE 120 does not get frequent data transmissions and hence delay may be acceptable. Hence, the UE 120 may apply features described above to reduce the power consumption. It may further be specified in a specification that one or more of the behaviors described above is applied when the UE 120 applies a certain type of DRX-cycle. According to another embodiment, the network may configure, depending on the type of DRX-cycle, which behavior(s) the UE 120 shall apply.

DRX Configuration Adjustment:

By applying one or more of the embodiments herein, the delay for communicating a packet may be increased which may negatively impact user experience and system efficiency.

In some embodiments, to avoid this, a DRX configuration may therefore be adjusted to reduce the delay. This may e.g. be done to compensate for the potential longer delay.

This may be performed by a network node 110, such as e.g. an eNB, configuring a DRX configuration for the UE 120 which makes the UE 120 wake up earlier if it applies the embodiments described herein. For example, the eNB may configure the UE 120 to apply a shorter DRX periodicity. This would then make the UE 120 wake up more frequently. Consider for example if the "wake up" message is applied where the UE requires an explicit indication to really wake up and the UE 120 is given a certain time $T_{WU}$ to actually wake up from the point in time in which the "wake up" message was received. In this case, there would be a delay of time $T_{WU}$ from the point in time where the UE 120 receives the "wake up" message until the UE 120 actually wakes up. When comparing a legacy UE A (not applying the "wake up" message) with a UE B which requires a "wake up" message to wake up, it would take an additional time $T_{WU}$ to wake up the UE B compared to UE A, since UE A is awake directly while UE B needs a time $T_{WU}$ to wake up. Hence, the network node 110, such as the eNB, may configure the UE B to wake up earlier and/or more frequently, in order to compensate for this additional delay.

This configuration may also be performed by sending the configuration message as described in Action 501.

UE Capabilities:

Since it may be implementation dependent whether the UE 120 is able to perform, or benefit from, the behaviors described above, the UE 120 may indicate to the network if it supports one or more of the behaviors described herein. The network node 110, such as an eNB, may then consider this when determining whether to configure these behaviors for the UE 120.

Applying the delays as disclosed in the embodiments described above, has the advantage that the UE 120 may avoid starting up all components every time it enters the onDuration which leads to a reduction of the power consumption of the UE 120.

It should be noted that the embodiments described herein are not mutually exclusive, rather they can be combined in any suitable manner.

Figure 6:
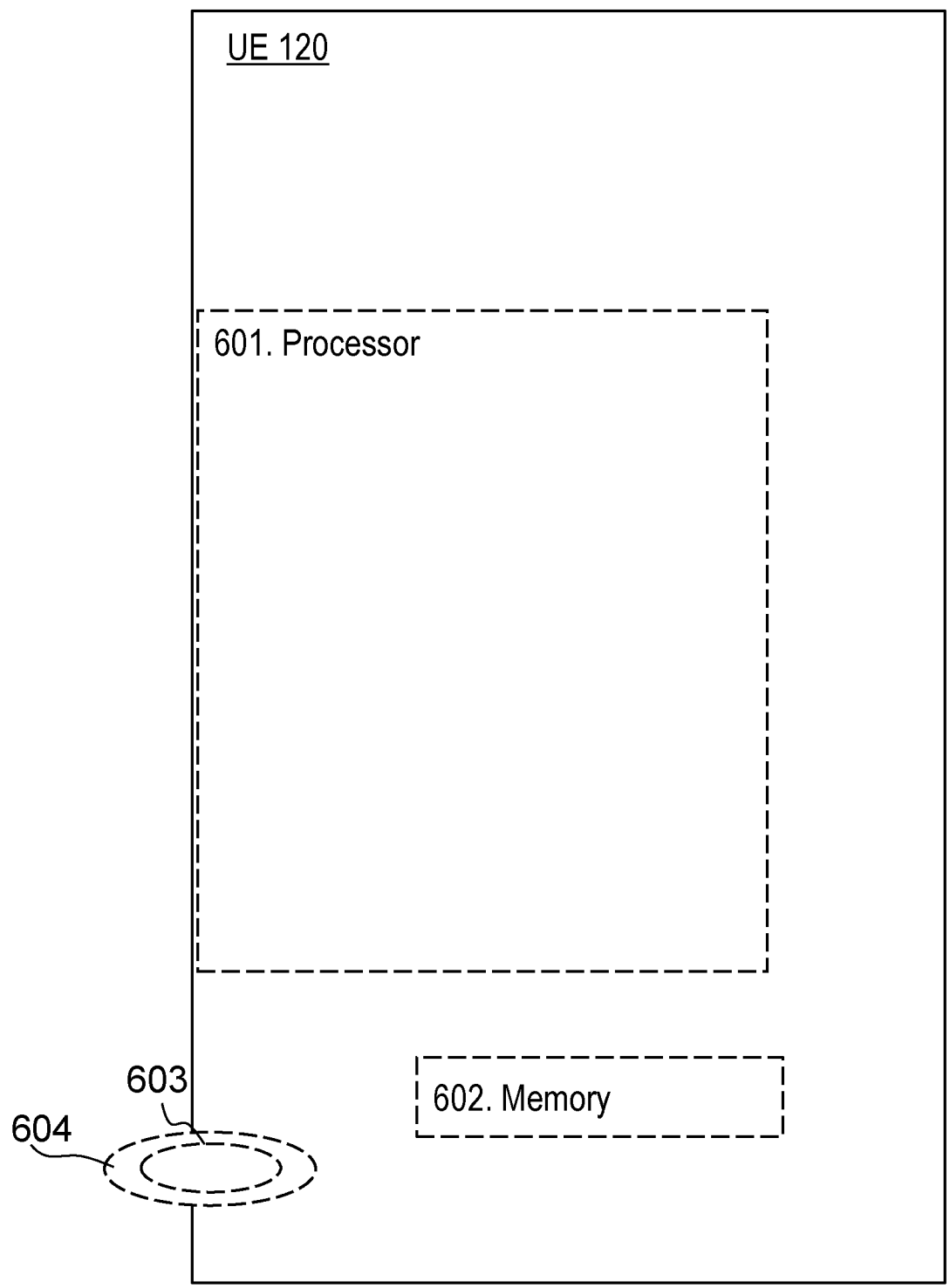
FIG. 6 is a schematic block diagram illustrating some first embodiments of a UE.

FIG. 6 is a block diagram depicting the UE 120 for performing the method for handling DRX operation. The UE 120 may comprise a processor 601, such as e.g. a processing circuitry, configured to perform the method as described herein, as performed by the UE 120. Dashed lines of a box in FIG. 6 indicate that this box is not mandatory and relate to some embodiments only.

The UE 120 is configured to apply a delay for at least one action performed as a response to data and/or signaling received by the UE 120 during a predefined first time period after the UE 120 has entered an active state.

The UE 120 may further be configured to apply a first decoding (D1) delay for signals received by the UE 120 during a predetermined first time period from the entering of the active state when the action is a decoding of a received signal. The first decoding delay (D1) is a longer decoding delay and the second decoding delay (D2) is a shorter decoding delay. Hence, the first decoding delay (D1) is an increased decoding delay in comparison to a second decoding delay (D2).

In some embodiments the UE 120 may further be configured to reduce or to remove the coding delay when the time from entering the active state has exceeded the predetermined first time limit.

The UE 120 may further be configured to apply the increased decoding delay only for data received during the active state.

The UE 120 may further be configured to delay the transmission of HARQ feedback for DownLink (DL) and/or UpLink (UL) data during a predetermined second time period after the UE 120 has entered the active state.

The UE 120 may further be configured to omit to send a HARQ feedback for DownLink, DL, and/or UpLink, UL data during the predetermined second time period after the UE 120 has entered the active state.

The UE 120 may further be configured to apply a delayed starting of the timer, such as the inactivity timer, during a predetermined third time period after the UE 120 has entered the active state.

The UE 120 may further be configured to apply an adjusted duration of the timer, such as the inactivity timer, when a delayed starting of the timer has been applied.

The UE 120 may further be configured to receive an indication from the network node 110, indicating that the UE 120 shall enter an awake state when it has been sleeping, and wherein the UE 120 may further be configured to apply a delay to the entering of the awake DRX state when the UE 120 has received an indication from the network node 110 that the UE 120 shall enter the awake state.

The UE 120 may further be configured to receive a message from a network node 110, which message comprises information regarding the actions to be delayed, and wherein the UE 120 may further be configured to apply the delay according to the information comprised in the message.

The UE 120 may further comprise a memory 602. The memory 602 may comprise one or more units to be used to store data on, such as system information, applications to perform the methods disclosed herein when being executed, and similar.

The methods according to the embodiments described herein for the UE 120 may respectively be implemented by means of e.g. a computer program 603 or a computer program product, comprising instructions, i.e., software code portions, which, when executed on at least one processor, cause the at least one processor to carry out the actions described herein, as performed by the determining module. The computer program 603 may be stored on a computer-readable storage medium 604, e.g. a disc or similar. The computer-readable storage medium 604, having stored thereon the computer program, may comprise the instructions which, when executed on at least one processor, cause the at least one processor to carry out the actions described herein, as performed by the UE 120. In some embodiments, the computer-readable storage medium may be a non-transitory computer-readable storage medium.

The embodiments herein may be implemented through one or more processors, such as the processor in the UE 120 depicted in FIG. 6, and/or a processor in a network node together with computer program code for performing the functions and actions of the embodiments herein. The program code mentioned above may also be provided as a computer program product, for instance in the form of a data carrier carrying computer program code for performing the embodiments herein when being loaded into the UE and/or the network node. One such carrier may be in the form of a CD ROM disc. It is however feasible with other data carriers such as a memory stick. The computer program code may furthermore be provided as pure program code on a server and downloaded to the UE and/or the network node.

Figure 7:
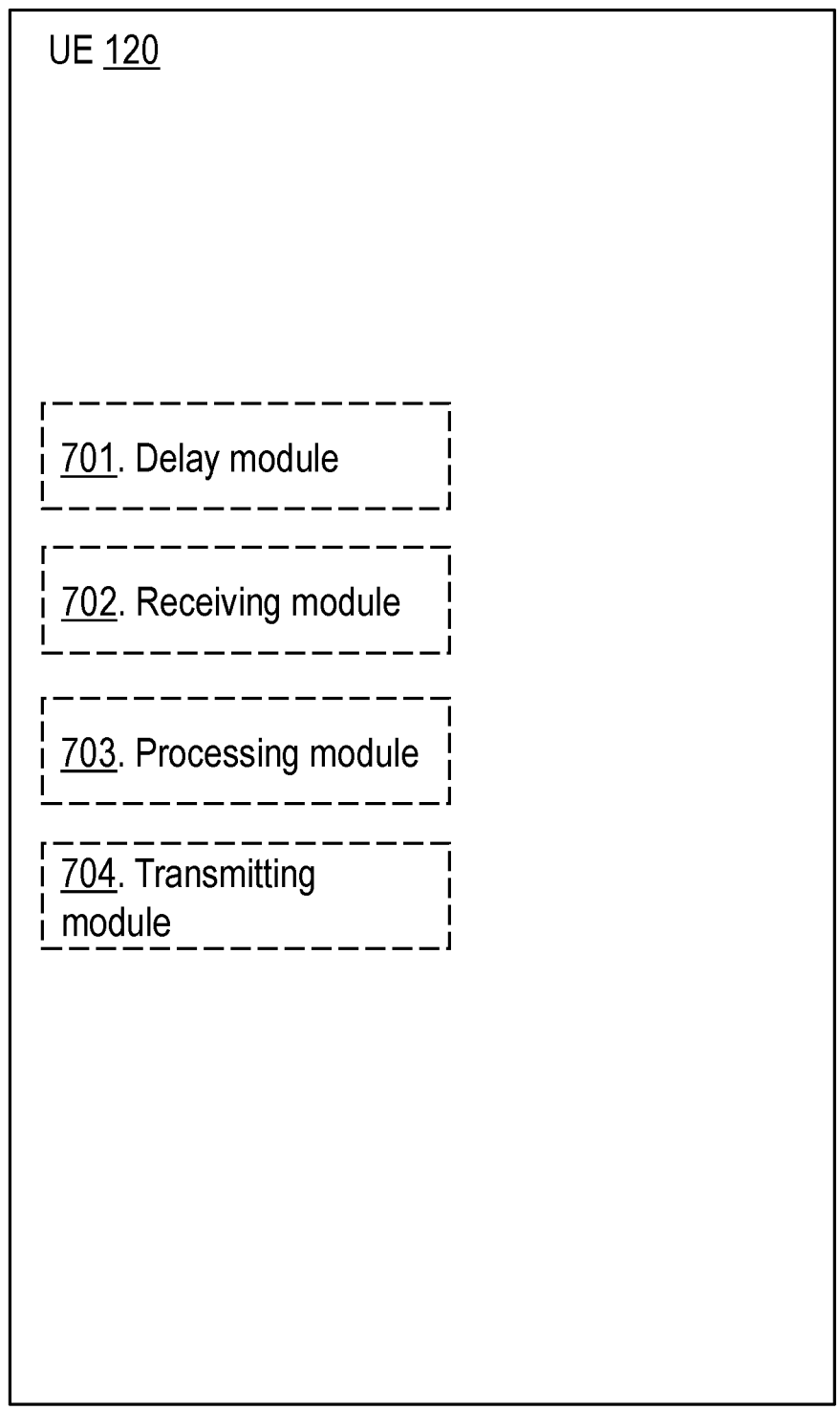
FIG. 7 is a schematic block diagram illustrating some second embodiments of a UE.

According to a possible implementation, shown in FIG. 7, the UE 120 may comprise a delay module 701, a receiving module 702, a processing module 703 and/or a transmitting module 704 configured for performing the method described herein, as performed by the UE 120.

In some embodiments, the UE 120 may comprise the delay module 701 being configured to apply a delay for at least one action performed as a response to data and/or signaling received by the UE 120 during a predefined first time period after the UE 120 has entered an active state.

In some embodiments, the UE 120 may comprise the delay module 701 further being configured to apply a first decoding (D1) delay for signals received by the UE 120 during a predetermined first time period from the entering of the active state when the action is a decoding of a received signal. The delay module 701 may further being configured to, reduce or to remove the coding delay when the time from entering the active state has exceeded the predetermined first time limit.

In some embodiments the delay module 701 may further being configured to apply the increased decoding delay only for data received during the active state.

In some embodiments the UE 120 may comprise the delay module 701 or the transmitting module 704 being configured to delay the transmission of HARQ feedback for DownLink (DL) and/or UpLink (UL) data during a predetermined second time period after the UE 120 has entered the active state.

In some embodiments the delay module 701 may further be configured to omit to send a HARQ feedback for DownLink, DL, and/or UpLink, UL data during the predetermined second time period after the UE 120 has entered the active state.

In some embodiments the delay module 701 may further be configured to apply a delayed starting of the timer, such as the inactivity timer, during a predetermined third time period after the UE 120 has entered the active state.

In some embodiments the delay module 701 may further be configured to apply an adjusted duration of the timer, such as the inactivity timer, when a delayed starting of the timer has been applied.

In some embodiments the UE 120 may comprise the receiving module 702 being configured to receive an indication from the network node 110 indicating that the UE 120 shall enter an awake state when it has been sleeping. The UE 120 may further comprise a processing module 703 or the delay module 701 further being configured to apply a delay to the entering of the awake DRX state when the receiving module has received an indication from the network node 110 that the UE 120 shall enter the awake state.

In some embodiments the receiving module 702 may further be configured to, receive a message from a network node 110, which message comprises information regarding the actions to be delayed. The delay module 701 may further be configured to, apply the delay according to the information comprised in the message.

As will be readily understood by those familiar with communications design, that functions means or modules described herein may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Figure 8:
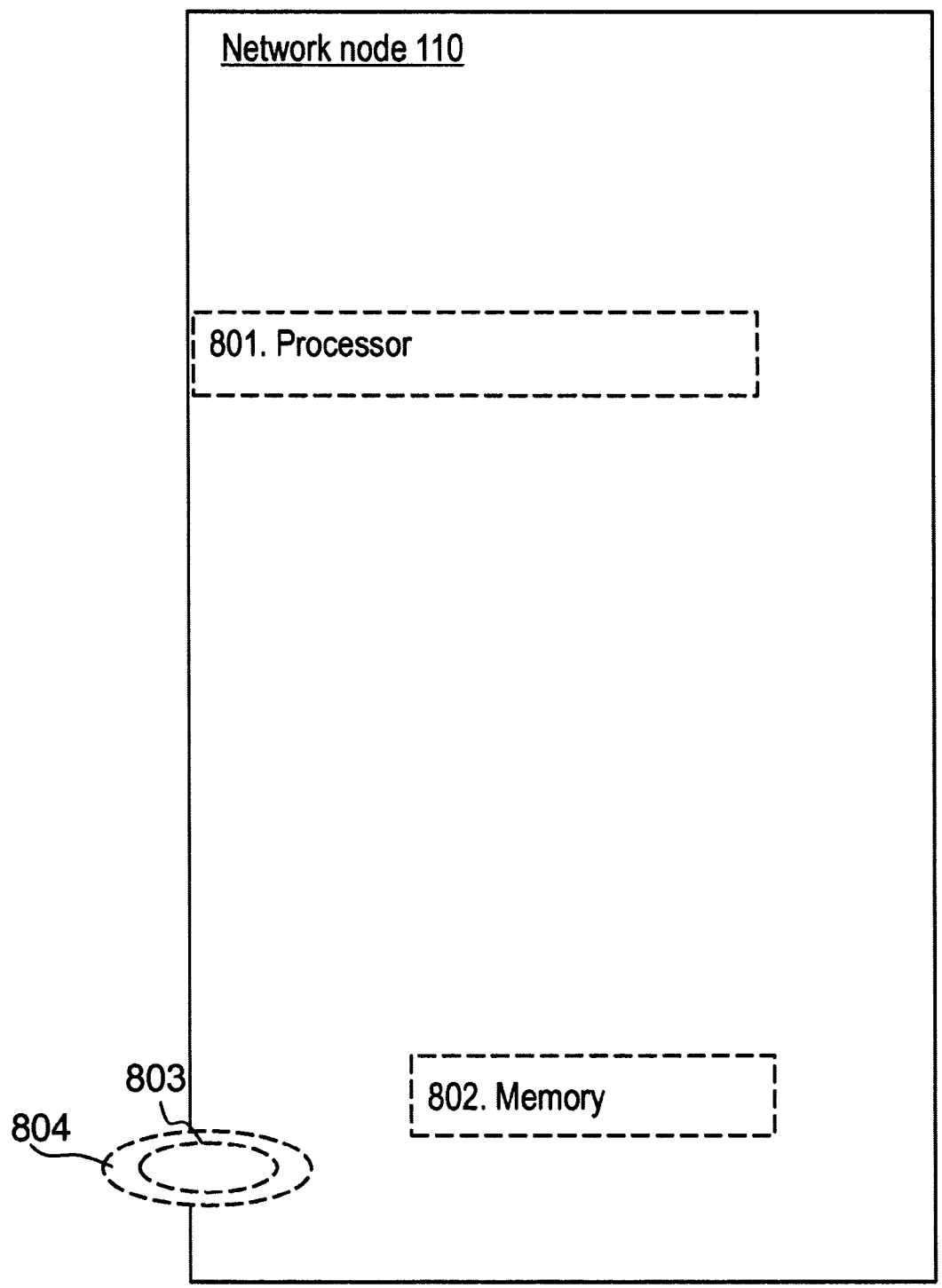
FIG. 8 is a schematic block diagram illustrating some first embodiments of a network node.

FIG. 8 is a block diagram depicting the network node 110 for performing the method for handling DRX operation. The network node 110 may comprise a processor 801, such as e.g. a processing circuitry, configured to perform the method as described herein, as performed by the network node 110. Dashed lines of a box in FIG. 8 indicate that this box is not mandatory and relate to some embodiments only.

The network node 110 is configured to send a configuration message to the UE 120, which message comprises information regarding actions to be delayed by the UE 120.

In some embodiments, the network node 110 may be configured to send a configuration message to the UE 120, which message comprises information regarding actions to be delayed by the UE 120.

The network node 110 may further comprise a memory 802. The memory 802 may comprise one or more units to be used to store data on, such as system information, applications to perform the methods disclosed herein when being executed, and similar.

The methods according to the embodiments described herein for the network node 110 may respectively be implemented by means of e.g. a computer program 803 or a computer program product, comprising instructions, i.e., software code portions, which, when executed on at least one processor, cause the at least one processor to carry out the actions described herein, as performed by the network node. The computer program 803 may be stored on a computer-readable storage medium 804 e.g. a disc or similar. The computer-readable storage medium 805 having stored thereon the computer program, may comprise instructions which, when executed on at least one processor, cause the at least one processor to carry out the actions described herein, as performed by the network node. In some embodiments, the computer-readable storage medium may be a non-transitory computer-readable storage medium.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

The embodiments herein may be implemented through one or more processors, such as the processor network node 110 depicted in FIG. 8 together with computer program code for performing the functions and actions of the embodiments herein. The program code mentioned above may also be provided as a computer program product, for instance in the form of a data carrier carrying computer program code for performing the embodiments herein when being loaded into the UE and/or the network node. One such carrier may be in the form of a CD ROM disc. It is however feasible with other data carriers such as a memory stick. The computer program code may furthermore be provided as pure program code on a server and downloaded to the UE and/or the network node.

Figure 9:
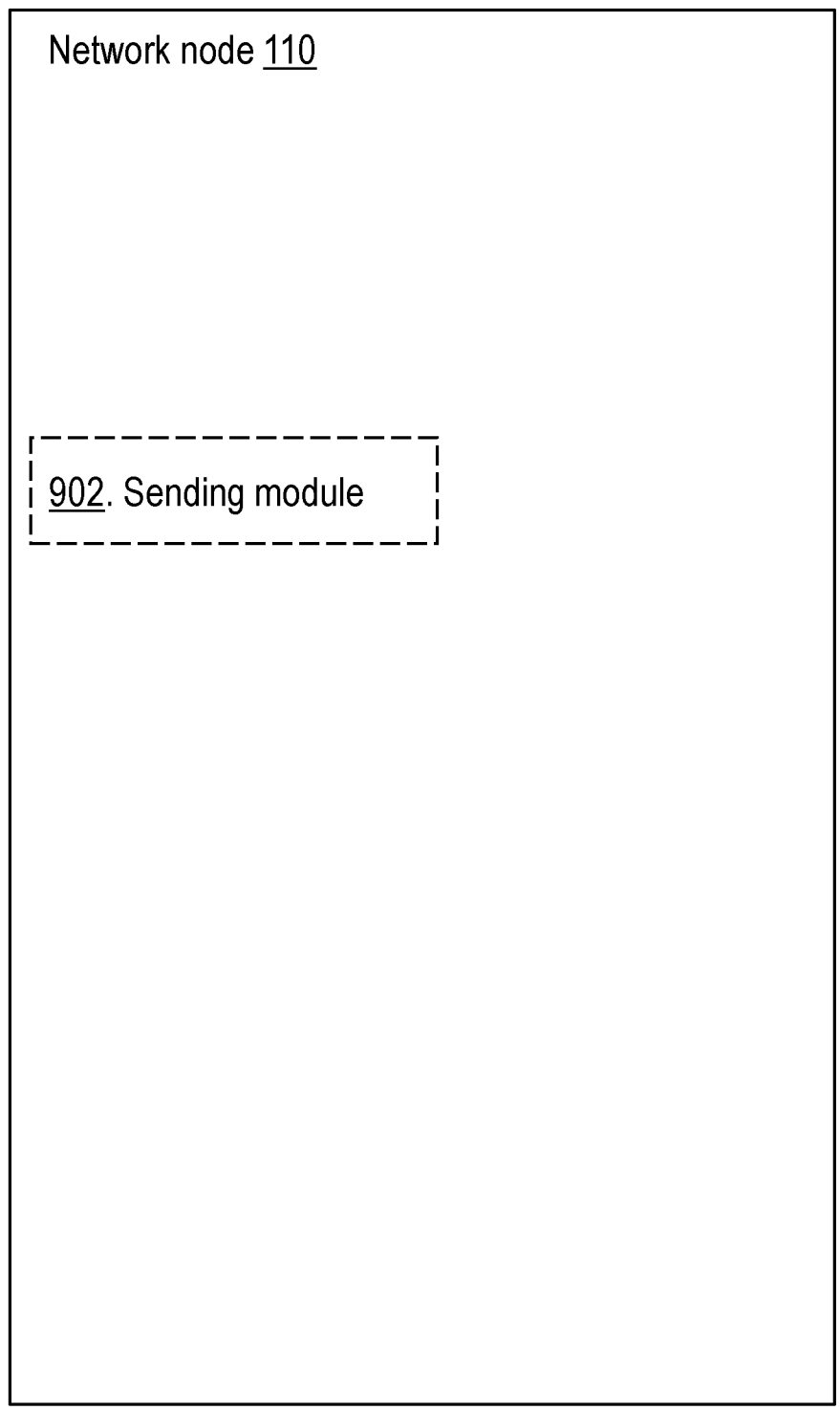
FIG. 9 is a schematic block diagram illustrating some second embodiments of a network node.

According to a possible implementation, shown in FIG. 9, the network node 110 may comprise a sending module 902 being configured to send a configuration message to the UE 120, which message comprises information regarding actions to be delayed by the UE 120.

As will be readily understood by those familiar with communications design, that functions means or modules described herein may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Thus, the methods according to the embodiments described herein performed by the UE 120 and/or the network node 110 may be implemented by means of a computer program product, comprising instructions, i.e. software code portions, which, when executed on at least one processor, cause the at least one processor to carry out the actions described herein, as performed by the UE 120 and/or the network node 110. The computer program product may be stored on a computer-readable storage medium. The computer-readable storage medium, having stored there on the computer program, may comprise the instructions which, when executed on at least one processor, cause the at least one processor to carry out the actions described herein, as performed by the UE 120 and/or the network node 110. In some embodiments, the computer-readable storage medium may be a non-transitory computer-readable storage medium.

The UE 120 and/or the network node 110 may further each comprise a memory comprising one or more memory units. The memory is arranged to be used to store obtained information such as indications of a mobility set, identifiers of APs and WLANs, identifiers of UEs, ciphering keys, measurements of signals from radio access nodes, measurement reports or parts thereof and applications etc. to perform the methods herein when being executed in the UE and/or the network node.

In some embodiments, a computer program comprises instructions, which when executed by the at least one processor such as the processor 601 and/or 801, cause the at least one processor 601 and/or 801 to perform actions according to any of the above Actions.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

The invention claimed is:

1. A method, performed by a User Equipment, UE, for handling discontinuous reception, DRX, operation, wherein the method comprises:
applying a delay for at least one action performed as a response to data and/or signalling received by the UE during a predefined first time period after the UE has entered an active state, wherein the delay is determined at least based on how lone the UE has been in the active state, wherein a longer delay is applied if the UE has been in the active state less than a threshold time period, and a shorter delay is applied if the UE has been in the active state more than the threshold time.

2. The method according to claim 1, wherein the action is a decoding of a received signal, and wherein the UE applies a first decoding delay for signals received by the UE during said predefined first time period.

3. The method according to claim 2, wherein the predefined first time period is one or more Transmission Time Intervals, TTI.

4. The method according to claim 2, wherein the UE applies a second decoding delay for signals received by the UE after the first time period, wherein the second decoding delay is shorter than the first decoding delay.

5. The method according to claim 2, wherein the UE applies the delay by applying the first decoding delay for data and/or signalling transmissions received during the active state.

6. The method according to claim 1 wherein the action is a transmission of Hybrid Automatic Repeat Request, HARQ, feedback, and wherein the UE applies the delay by delaying the transmission of HARQ feedback for downlink, DL, and/or uplink, UL, data during a predefined second time period after the UE has entered the active state.

7. The method according to claim 6, wherein the predefined second time period is one or more Transmission Time Intervals, TTIs.

8. The method according to claim 6, wherein the UE omits to send a HARQ feedback for DL and/or UL data during the predefined second time period after the UE has entered the active state.

9. The method according to claim 1 wherein the action is a starting of a timer and wherein the UE applies the delay by applying a delayed starting of the timer until a predefined third time period after the UE has entered the active state has passed.

10. The method according to claim 9, wherein the predefined third time period is one or more Transmission Time Intervals, TTIs.

11. The method according to claim 9, wherein the UE applies an adjusted duration of the timer when a delayed starting of the timer has been applied.

12. The method according to claim 1, wherein the action is an entering of a DRX state, and wherein, when the UE has received an indication from a network node indicating that the UE shall enter an active state when it has been inactive, the UE applies the delay by applying a delay to the entering of the active state.

13. The method according to claim 1, wherein the method further comprises:
receiving, prior to applying the delay for one or more actions, a configuration message from the network node, which message comprises information regarding the actions to be delayed and wherein the UE applies the delay according to the information comprised in the message.

14. A method, performed by a network node, for handling discontinuous reception, DRX, operation, wherein the method comprises:
sending a configuration message to a User Equipment, UE, which message configures the UE to apply a delay for at least one action performed as a response to data and/or signalling received by the UE during a predefined first time period after the UE has entered an active state, wherein the configuration message comprises a delay that indicates the amount of time the least one action should be delayed, wherein the delay is determined at least based on how lone the UE has been in the active state, wherein a longer delay is applied if the UE has been in the active state less than a threshold time period, and a shorter delay is applied if the UE has been in the active state more than the threshold time.

15. The method according to claim 14, wherein the configuration message further comprises information about which action or actions to apply the delay to and/or conditions for when the delays should be applied.

16. The method according to claim 15, wherein the condition is the type of DRX-cycle the UE applies.

17. The method according to claim 14, wherein the action is a decoding of a received signal, and the information comprises a decoding delay to be applied to signals received by the UE during a predetermined first time period from the entering of an active state DRX onDuration period.

18. The method according to claim 14, wherein the action is an exiting of a DRX state and the information comprises an indication that the UE shall exit an inactive state.

19. The method according to claim 18, wherein the information further comprises a time period within which the UE is required to exit the inactive state.

20. A User Equipment, UE, for performing a method for handling discontinuous reception, DRX, operation, wherein the UE is configured to apply a delay for at least one action performed as a response to data and/or signalling received by the UE during a predefined first time period after the UE has entered an active state, wherein the delay is determined at least based on how long the UE has been in the active state, wherein a longer delay is applied if the UE has been in the active state less than a threshold time period, and a shorter delay is applied if the UE has been in the active state more than the threshold time.

21. The UE according to claim 20, wherein the action is a decoding of a received signal, and wherein the UE is configured to apply a first decoding delay for signals received by the UE during a predefined first time period from the entering of the active state.

22. The UE according to claim 20, wherein the UE is configured to apply a second coding delay when the time from entering the active state has exceeded the predefined first time period.

23. The UE according to claim 20, wherein the UE is further configured to apply the increased decoding delay only for data received during the DRX onDuration period.

24. The UE according to claim 20, wherein the action is a transmission of a Hybrid Automatic Repeat Request, HARQ, feedback, and wherein the UE is configured to delay the transmission of HARQ feedback for DownLink, DL, and/or UpLink, UL, data during a predefined second time period after the UE has entered the active state.

25. The UE according to claim 24, wherein the UE omits to send a HARQ feedback for DL and/or UL, data during the predefined second time period after the UE has entered the active state.

26. The UE according to claim 20, wherein the action is a starting of a timer and wherein the UE is configured to applies a delayed starting of the timer during a predefined third time period after the UE has entered the active state.

27. The UE according to claim 20, wherein the action is an entering of a DRX state, and wherein the UE is configured to receive an indication from a network node indicating that the UE shall enter an active state when it has been inactive, and wherein the UE is further configured to apply a delay to the entering of the active state when the UE has received the indication from the network node.

28. A User Equipment, UE, for handling discontinuous reception, DRX, operation comprising a processor and a memory, said memory containing instructions executable by said processor whereby said UE is configured to apply a delay for at least one action performed as a response to data and/or signalling received by the UE during a predefined time period after the UE has entered an active state, wherein the delay is determined at least based on how long the UE has been in the active state, wherein a longer delay is applied if the UE has been in the active state less than a threshold time period, and a shorter delay is applied if the UE has been in the active state more than the threshold time.

29. A network node, for performing a method for handling discontinuous reception, DRX, operation the network node comprising:

a sending module configured to send a configuration message to a User Equipment, UE, which message comprises information regarding actions to be delayed by the UE, wherein the configuration message comprises a delay that indicates the amount of time the least one action should be delayed, wherein the delay is determined at least based on how long the UE has been in the active state, wherein a longer delay is applied if the UE has been in the active state less than a threshold time period, and a shorter delay is applied if the UE has been in the active state more than the threshold time.

30. A network node, for handling discontinuous reception, DRX, operation comprising a processor and a memory, said memory containing instructions executable by said processor whereby said network node is configured to send a configuration message to a User Equipment, UE, which message comprises information regarding actions to be delayed by the UE, wherein the configuration message comprises a delay that indicates the amount of time the least one action should be delayed, wherein the delay is determined at least based on how long the UE has been in the active state, wherein a longer delay is applied if the UE has been in the active state less than a threshold time period, and a shorter delay is applied if the UE has been in the active state more than the threshold time.

* * * * *